United States Patent [19]

Murata et al.

[11] 4,408,236

[45] Oct. 4, 1983

[54] MAGNETIC TAPE RECORDING AND/OR REPRODUCING APPARATUS

[75] Inventors: Shigeki Murata, Nara; Jirou Kajino; Hitoshi Minabe, both of Neyagawa, all of Japan

[73] Assignee: Matsushita Electric Industrial Co., Ltd., Osaka, Japan

[21] Appl. No.: 230,367

[22] Filed: Jan. 30, 1981

[30] Foreign Application Priority Data

Feb. 8, 1980 [JP] Japan ................................ 55-15263

[51] Int. Cl.³ ........................ G11B 5/08; G11B 15/00
[52] U.S. Cl. ...................................... 360/85; 360/95
[58] Field of Search ............... 360/93, 95, 85, 96.1, 360/96.4

[56] References Cited

U.S. PATENT DOCUMENTS

| | | | |
|---|---|---|---|
| 4,045,820 | 8/1977 | Staar | 360/85 |
| 4,121,267 | 10/1978 | Hayashi | 360/95 |
| 4,138,699 | 2/1979 | Ura | 360/95 |
| 4,258,399 | 3/1981 | Iijima | 360/95 |
| 4,309,731 | 1/1982 | Yoshida | 360/85 |

Primary Examiner—Robert M. Kilgore
Attorney, Agent, or Firm—Wenderoth, Lind & Ponack

[57] ABSTRACT

A magnetic tape recording and/or reproducing apparatus wherein a magnetic tape is drawn out of a tape cartridge by a tape loading mechanism which is moved from its inoperative position to its operative position by the rotational power of a motor, and which motor also drives an operating mode changing mechanism which changes the operating mode of the apparatus.

9 Claims, 9 Drawing Figures

MAGNETIC TAPE RECORDING AND/OR REPRODUCING APPARATUS

This invention relates generally to a magnetic tape recording and/or reproducing apparatus of an automatic-tape-loading and -unloading type and more particularly to an apparatus wherein a magnetic tape is drawn out of a tape cartridge and loaded into a specific tape path for the recording/reproducing mode of operation. This type of apparatus requires return of the tape into the cartridge before ejection of the tape cartridge from the apparatus.

Still more specifically, the invention relates to an automatic tape-loading and -unloading type recording/reproducing apparatus having tape returning means and operating mode changing means having a simple construction.

A recording/reproducing apparatus of the automatic-tape-loading and unloading type accomplishes recording/reproducing by drawing the magnetic tape out of a tape cartridge and wrapping it around a guide drum over a specific angular range as well as winding the magnetic tape onto a take-up-reel or a supply-reel, and then returning the magnetic tape into the original tape cartridge in the fast-winding mode of the apparatus. In this apparatus, an operation is required for changing the operating mode of the apparatus. Usually, an operator changes the operating mode by pushing a button corresponding to the desired condition of the apparatus, that is the, recording mode, reproducing mode, stopping mode (inoperative mode), fast-forward-winding mode, or fast-rewinding mode, et cetera, so as to drive an operating mode changing mechanism. This mechanism requires distinct power supplies for the tape loading/unloading operation and the mode changing operation, that is, a motor for the tape loading/unloading operation, and an expensive electric element (such as a plunger) for the mode changing operation.

Accordingly, it is a principal object of the present invention to provide an improved and useful recording/reproducing apparatus which overcomes the above described disadvantages.

Another object of the present invention is to provide an improved recording/reproducing apparatus which has one motor for driving both the tape-loading and unloading means and the operating mode changing means.

Still another object of the present invention is to provide an improved recording/reproducing apparatus wherein an intermittent driving means intermittently transmits the rotational power of the motor to said tape loading/unloading means and said operating mode changing means comprises a rotating member which rotates to plural positions in synchronization with rotation of said motor and changes the operating mode of said apparatus to conditions corresponding to said plural positions. All of the rotational power of the motor is transmitted intermittently and/or selectively only to said tape loading/unloading means and said operating mode changing means when the apparatus is in the recording/reproducing modes, and only to said operating mode changing means when the apparatus is in the fast winding mode.

Still another object of the present invention is to provide an improved recording/reproducing apparatus in which an operator can change the operating mode with minimal force and rapidly from the recording/reproducing mode to the fast winding mode or vice versa, because such changes of mode depend only on the rotational direction of one and the same motor.

Yet another object of the present invention is to provide an improved recording/reproducing apparatus which produces little operating noise when changing from the recording/reproducing mode of the fast-winding mode or vice versa.

These objects are achieved by providing a recording/reproducing apparatus according to the present invention.

Further objects and advantages of this invention will become apparent from the following detailed description considered in connection with the accompanying drawings, in which.

Figure 1:
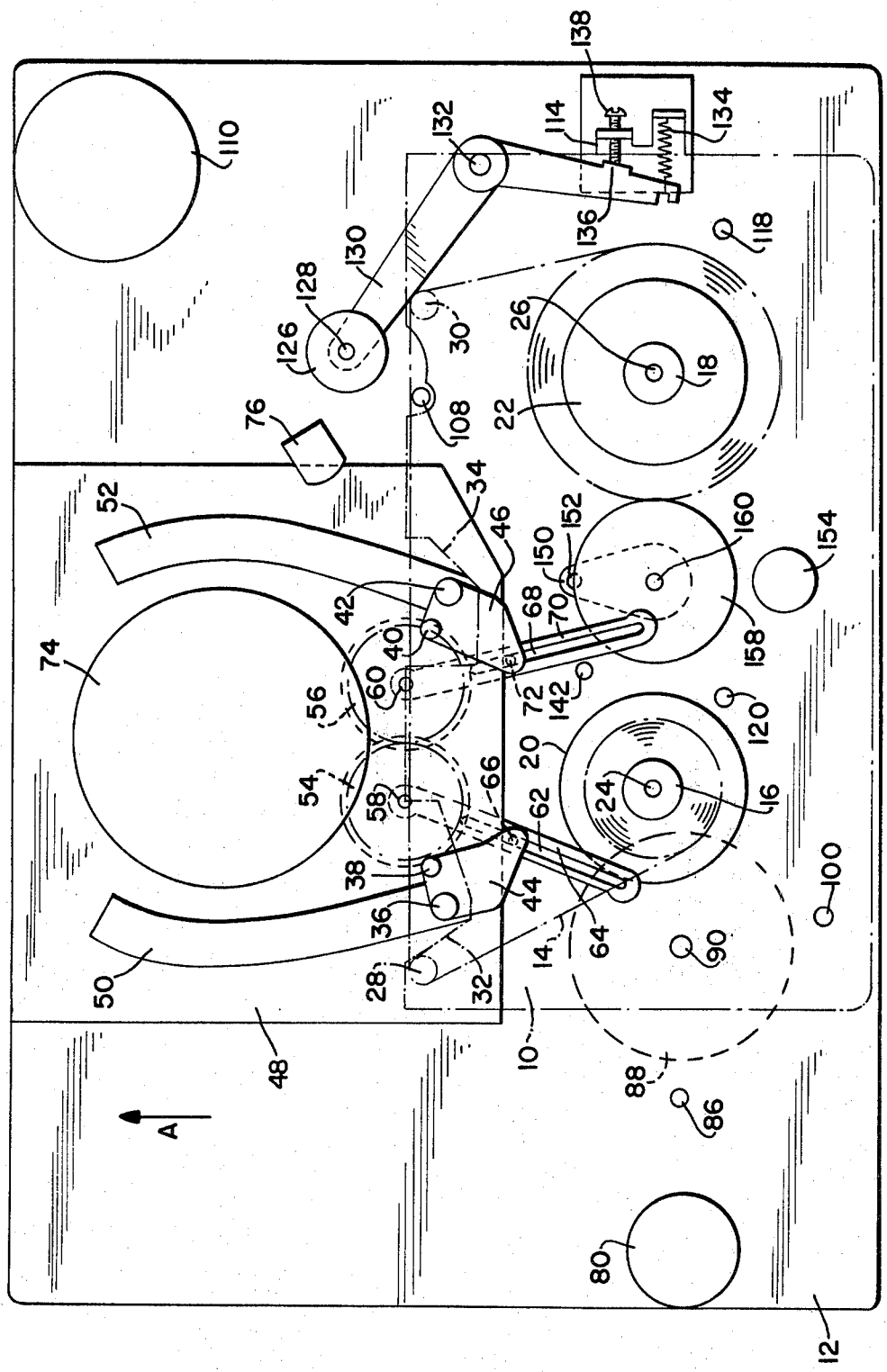
FIGS. 1, 3 and 5 are schematic top plan views of one embodiment of a tape recording/reproducing apparatus according to this invention, and which illustrate the position of a tape cartridge, in dot-dash lines, which cartridge is positioned on the apparatus in the stop-mode, the recording/reproducing mode, and the fast winding mode, respectively.

Referring now to the drawings, the construction and the operation of the tape recording/reproducing apparatus according to the present invention will be described hereinafter.

Figure 3:
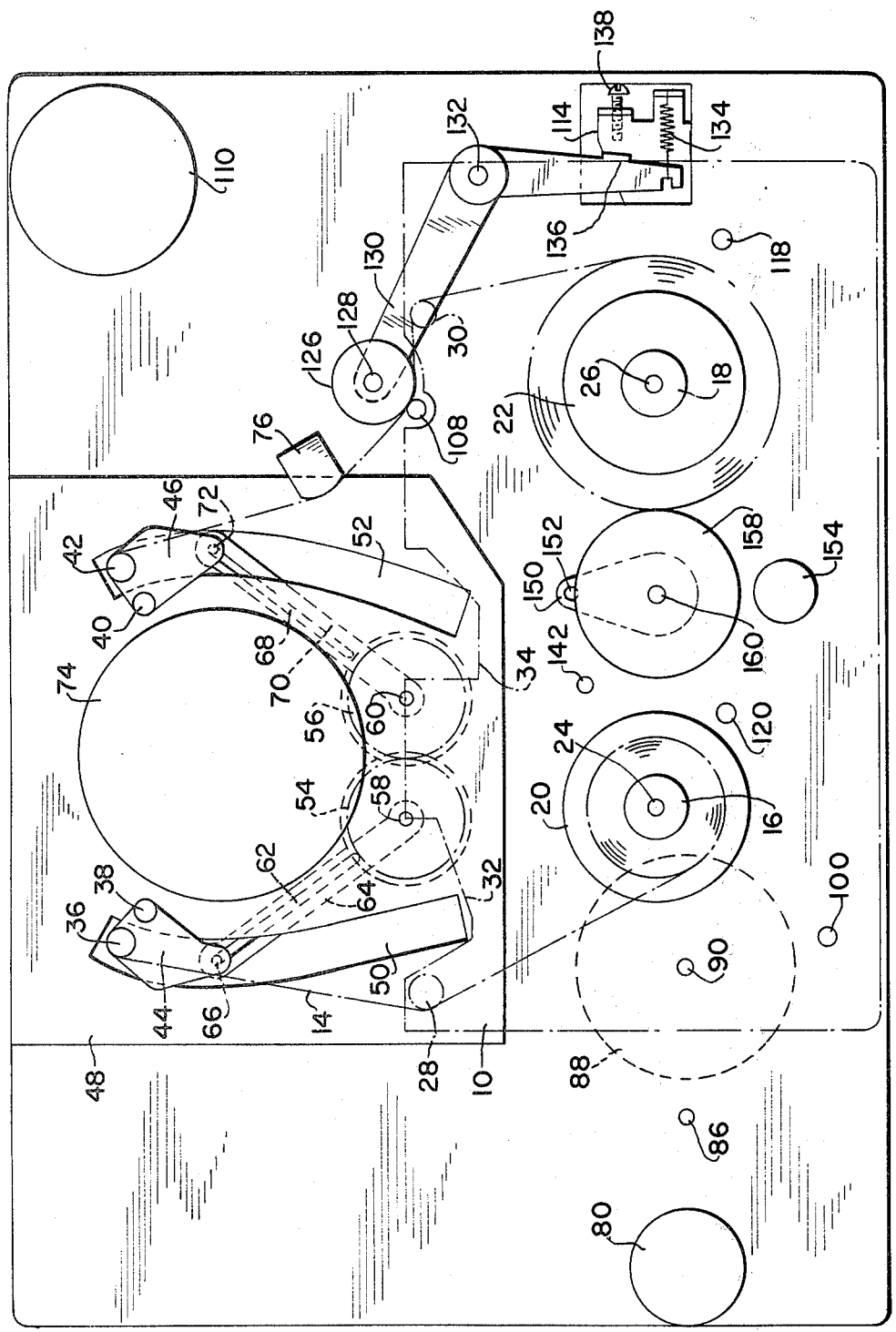
Figure 5:
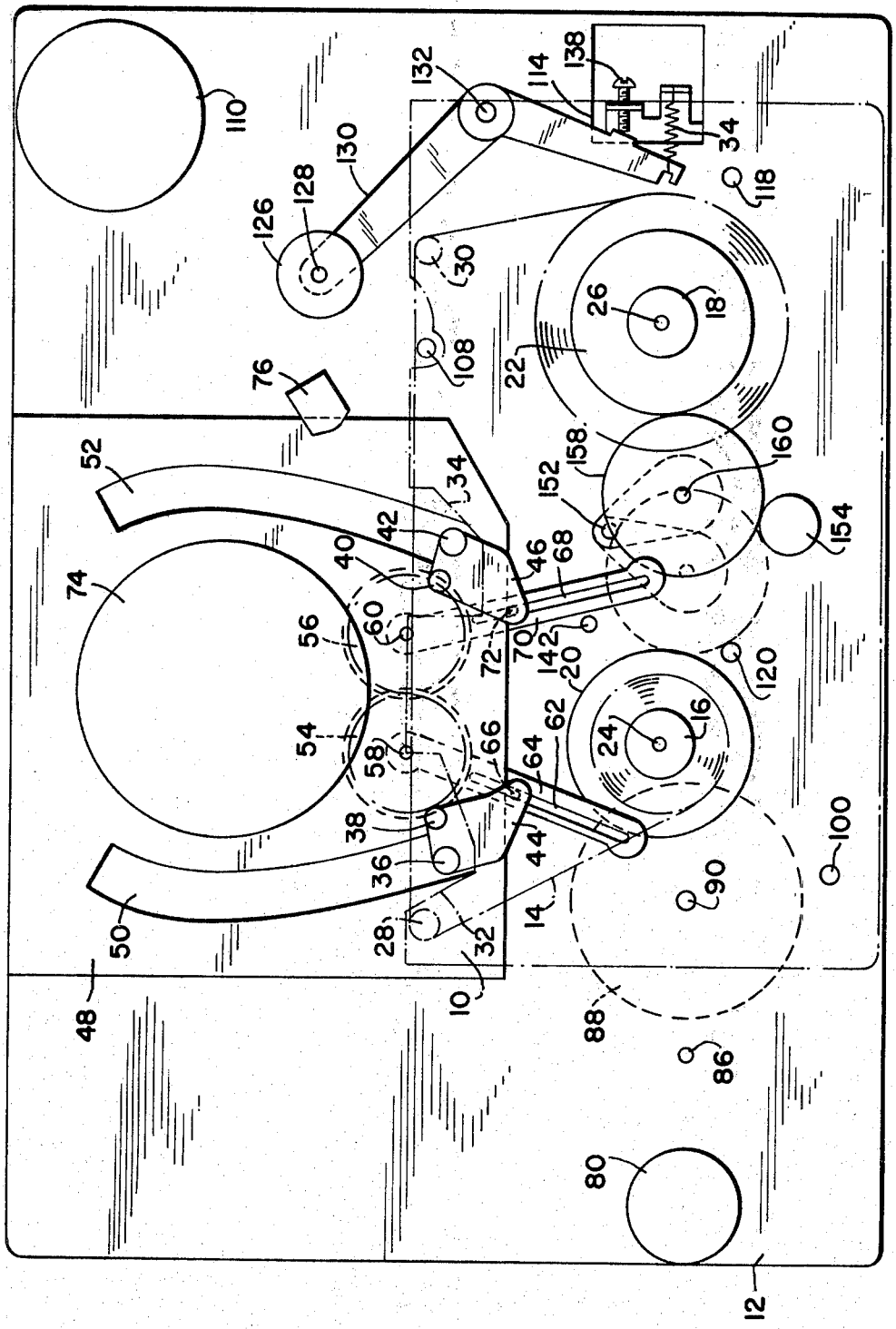

A tape cartridge 10 is set on a chassis 12 as shown in dot-dash lines in FIGS. 1, 3 and 5. The tape cartridge 10 includes a magnetic tape 14 wound on and extending between a supply reel 16 and a take-up reel 18 which are rotatably mounted in the tape cartridge 10. A supply reel drive turntable 20 and a take-up reel drive turntable 22 are rotatably mounted on spaced-apart shafts 24 and 26 fixed on the chassis 12, and are adapted to extend into the tape cartridge 10 to engage with the respective reels 16 and 18.

Within the tape cartridge 10, there are further provided tape guide pins 28 and 30, the magnetic tape 14 drawn out from the supply reel 16 being guided by the guide pin 28 past the front surface of the tape cartridge 10, and then passing around the guide pin 30 to the take-up reel 18. The tape cartridge 10 is provided at its front with two recesses 32 and 34 as shown in FIG. 1.

In the inoperative condition of the apparatus, two pairs of guide pins 36, 38 and 40, 42 which are respectively mounted on a first slider 44 and a second slider 46, are within the respective recesses 32 and 34 and behind the magnetic tape. These sliders 44 and 46 are slidably mounted on a sub-chassis 48 and guided along respective grooves 50 and 52 by suitable guide means (not shown).

A pair of gears 54 and 56 which engage with each other are rotatably mounted on the shafts 58 and 60 extending downward from the sub-chassis 48. A slot 62 formed in an arm 64 which is fixed on the gear 54 engages with a pin 66 extending downward from the first slider 44. Therefore, when the gear 54 and the arm 64 rotate clockwise in FIG. 1, the first slider 44 slides in the direction of arrow A along the groove 50, and guide pins 36 and 38 draw the magnetic tape 14 out of the tape cartridge 10. A slot 68 cut in an arm 70 which is fixed on the gear 56 is engaged with a pin 72 extending downward from the second slider 46 so as to draw the magnetic tape 14 out of the tape cartridge 10 by guide pins 40 and 42 during counter-clockwise rotation of gear 56 and arm 70. When the gears 54 and 56 have been rotated a predetermined amount, the first slider 44 and the second slider 46 reach operative positions as shown in FIG. 3, and the magnetic tape 14 is loaded around a guide drum 74 and against an audio magnetic head 76.

Figure 2:
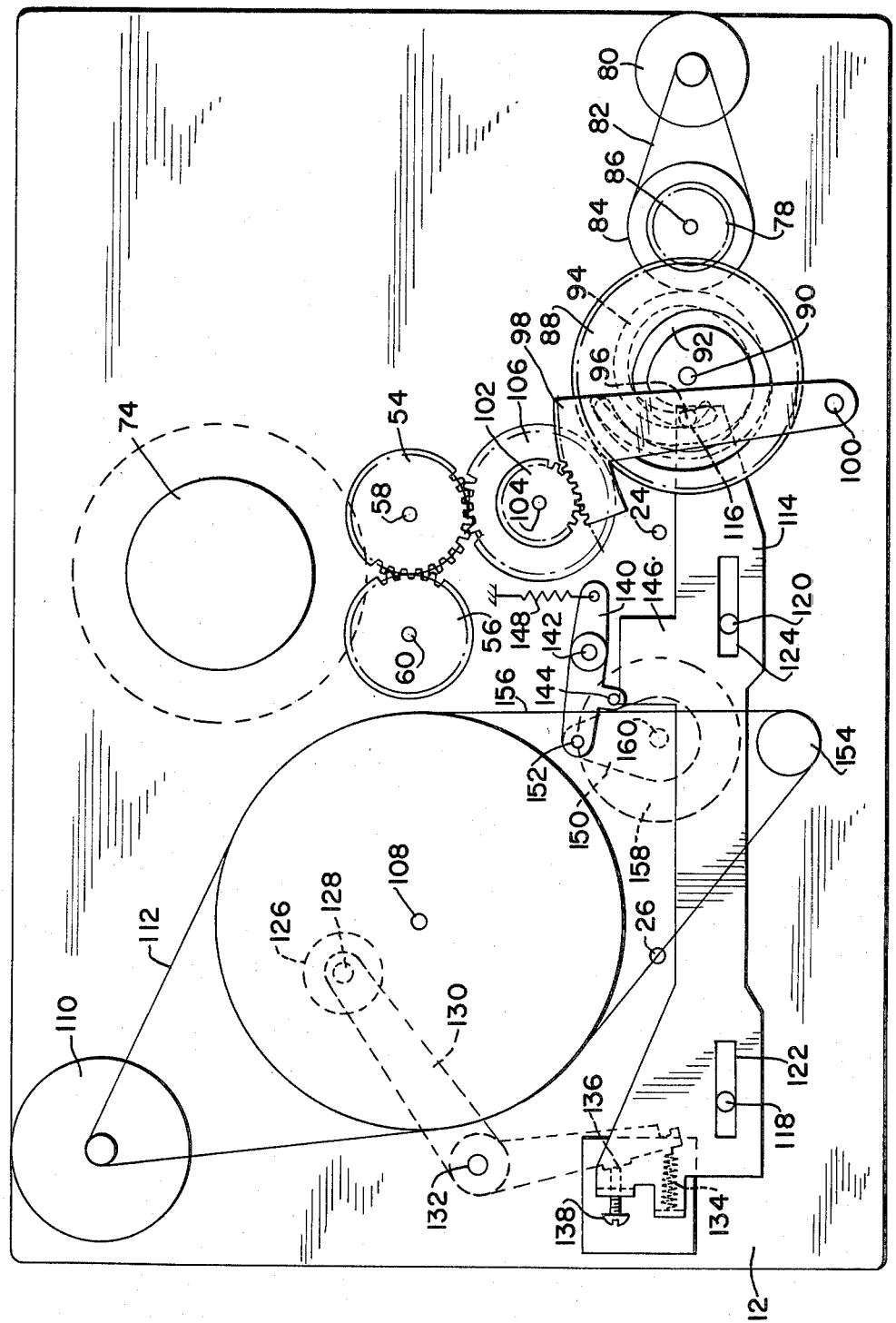
FIGS. 2, 4 and 6 are schematic bottom plan views of the apparatus of FIGS. 1, 3 and 5.
Figure 7A:
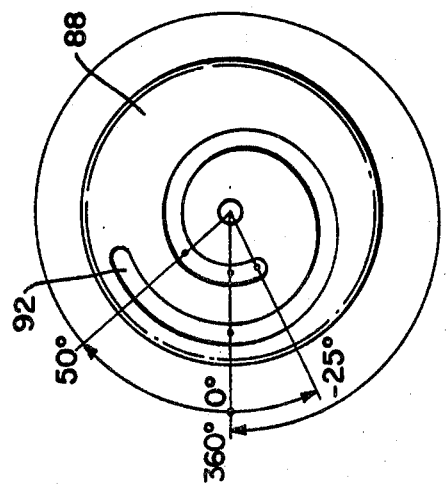
FIG. 7(A) is a schematic top plan view of the cam disk forming part of the apparatus.
Figure 7B:
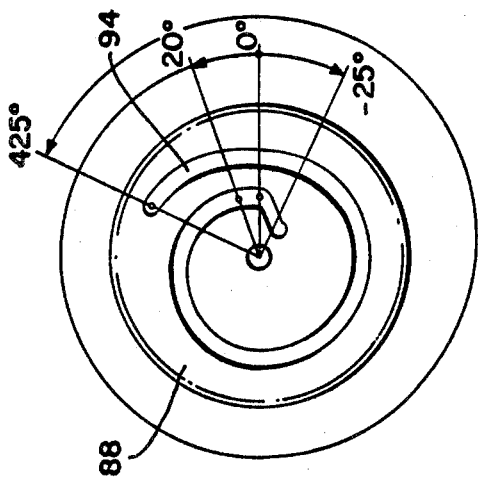
FIG. 7(B) is a schematic bottom plan view of the cam disk of FIG. 7(A)

In FIG. 2, a gear disk 78, which is driven by a motor 80 through a belt 82 and a pulley 84, is rotatably mounted on the shaft 86 fixed on the chassis 12. And a gear disk 78 is engaged with a cam disk 88 rotatably mounted on a shaft 90 fixed on the chassis 12. The cam disk 88 has two cam grooves 92 and 94 extending more than 360 degrees and on opposite side of cam disks 88, respectively, as shown in FIG. 7(A) and 7(B), and the amount of the cam lift varies depending on the specific range of the number of degrees of cam rotation. Rotation in an amount of more than 360° is chosen here so as to obtain an appropriate speed of the tape drawing-out operation. If some other mechanism is used, the rotational should sometimes be varied, e.g. to less than 360°, for obtaining an appropriate operation speed.

Figure 8:
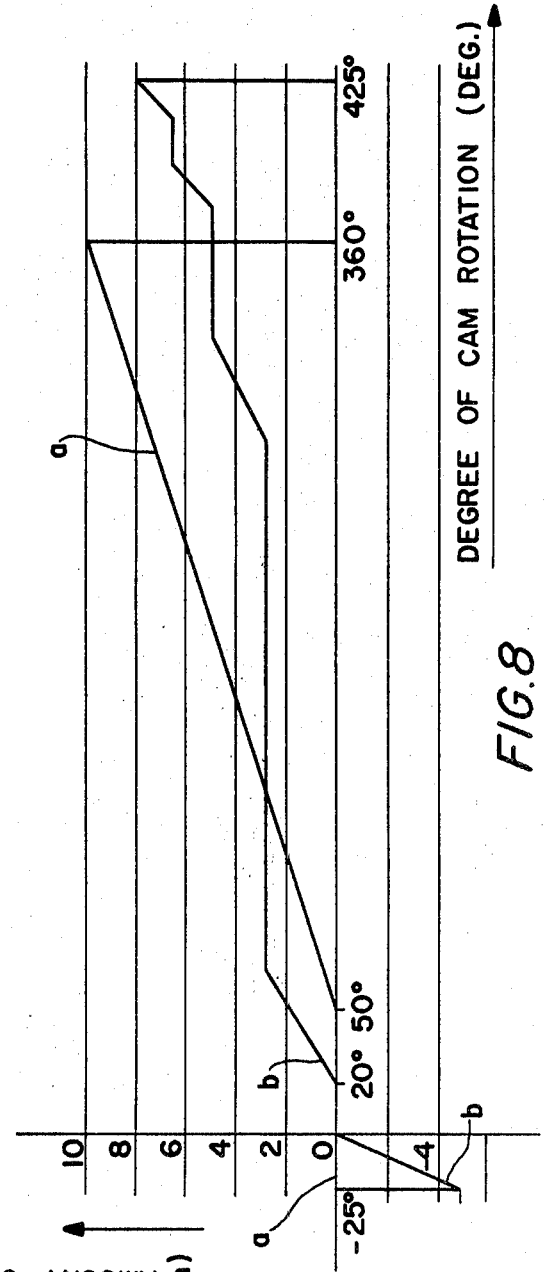
FIG. 8 is a diagram which shows the relationship between the amount of cam lift and degree of cam rotation.

In FIG. 8, the symbol "a" designates the curve corresponding to the camlift for the cam groove 92, and the symbol "b" designates the curve corresponding to the camlift for the cam groove 94. A first cam follower 96 is engaged with the cam groove 92, but is moved only between 50° and 360°, as shown by the curve "a" in FIG. 8, and a sector gear 98 rotatably mounted on a shaft 100 and having the first cam follower 96 secured thereon is swung through a specific range of cam rotation by the action of cam groove 92 and follower 96.

The sector gear 98 engages with a first idler gear 102 rotatably mounted on a shaft 104. A second idler gear 106 which rotates together with the first idler gear 102 engages with the gear 54 which has been described hereinabove. During the counter-clockwise rotation of the cam disk 88 from 0° to 50° in FIG. 2, the sector gear 98 is not moved. After 50°, the sector gear 98 is swung counter-clockwise around the shaft 100, and the gear 106 rotates clockwise and the gear 54 rotates counter-clockwise in FIG. 2, causing the pair of sliders 44 and 46, with the two pairs of guide pins 36, 38 and 40, 42, to move in the arrow A direction so as to draw the magnetic tape 14 out of the tape cartridge 10 as shown in FIG. 3.

It should be noticed that the cam disk 88 drives sliders 44 and 46 only during rotation between 50° and 360°. Then the first slider 44 and the second slider 46 come to the operative position shown in FIG. 3. Consequently, the magnetic tape 14 drawn out of the tape cartridge 10 is loaded around a guide drum 74 and against an audio head 76.

On the other hand, between 0° and 25°, the guide pins 36, 38 and 40, 42 remain at the position shown in FIG. 1, because no cam lift occurs as shown in FIG. 8 by curve "a", so that the sector gear 98 is not driven.

A capstan 108 is rotatably mounted on the chassis 12 and driven by a capstan motor 110 through a belt 112 as shown in FIG. 2. A main rod 114 containing a second cam follower 116 engaged with the cam groove 94 of the cam disk 88, is mounted for movement in the left or right direction in FIG. 2 on guide shafts 118, 120 fixed on the chassis 12 engaged in guide slots 122, 124 cut on the main rod 114.

The second cam follower 116 is driven through a specific range of degrees of cam rotation, as shown by the curve "b" in FIG. 8. During the counterclockwise rotation of the cam disk 88 from 0° to 20° in FIG. 2, the main rod 114 is not driven, but after 20°, the main rod 114 moves in the left direction in FIG. 2, on the guide shafts 118 and 120 in guide slots 122 and 124. The angle 20° is chosen here as an allowance for the motor rotation which occurs even after the turning-off of the switch due to the inertia of the motor. If the motor stops more quickly, the angle can be made smaller. When the cam rotation reaches 425°, the main rod 114 reaches the position shown in FIG. 4, and the motor 80 stops, because a switch (not shown) is turned off.

A pinch roller 126 is rotatably mounted on a shaft 128 fixed on a support arm 130 which is pivotably mounted on a shaft 132 fixed on the chassis 12. The pinch roller 126 is movable toward and away from the capstan 108 by the swing motion of the support arm 130 about the shaft 132. A tension spring 134 is positioned between the support arm 130 and the main rod 114. A stop 136 formed on the support arm 130 is located so as to move toward and away from the tip of a screw 138.

Consequently, during counterclockwise rotaion of the cam disk 88 from 0° to 20° in FIG. 2, the support arm 130 and pinch roller 126 remains in the position shown in FIG. 1, because the main rod 114 does not move. When the rotation reaches 20°, the main rod 114 begins to move in the left direction in FIG. 2, that is, in the right direction in FIG. 1, and the support arm 130 begins to swing counterclockwise in FIG. 1.

Figure 4:
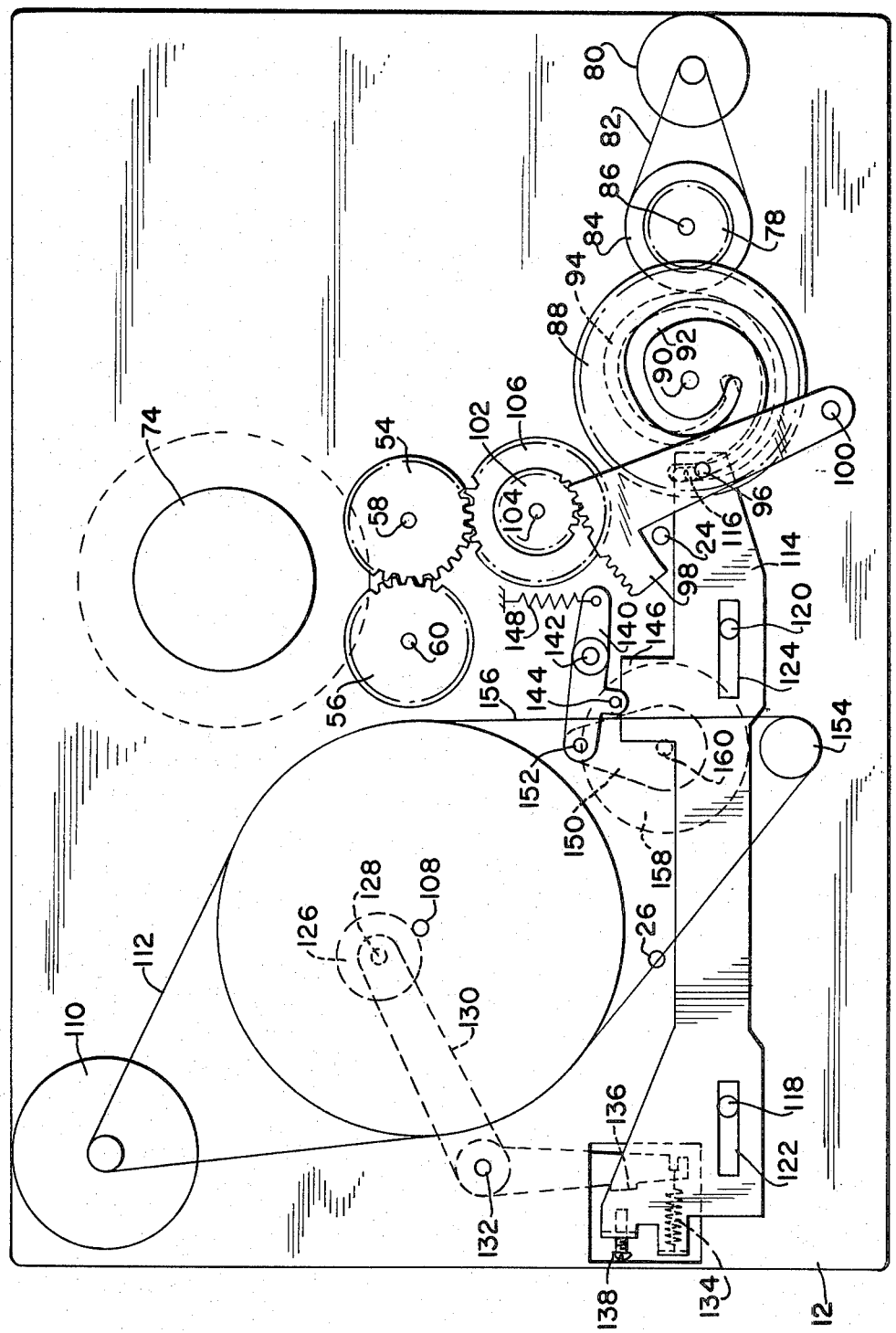

As the main rod 114 reaches the position shown in FIG. 4, the pinch roller 128 touches and presses against the capstan 108 under the elastic force of the tension spring 134 because it is separated from the stop 136 and the tip of the screw 138, and the tension spring 134 is stretched out when the main rod 114 reaches the position shown in FIG. 4, the pinch roller 126 thus pressing against the capstan 108 with the desired force. In FIG. 3, the magnetic tape 14 is fed by the capstan 108 and the pinch roller 126 and wound on the take-up reel 18 by well known means (not shown) previously employed.

As shown in FIG. 2, an arm 140 is pivotally mounted on a shaft 142 fixed on the chassis 12, and is provided with a pin 144 which is movable toward and away from a projecting stop 146 formed on the main rod 114, and the arm is urged for counterclockwise rotation by a tension spring 148. A support plate 150 is pivotally mounted on a shaft 152 fixed on the arm 140. A pulley 154 is driven by the capstan motor 110 through the belts 112 and 156, and a fast winding pulley 158 selectively positioned between the pulley 154 and one of the reel drive turntables 20 and 22 is rotatably mounted on a shaft 160 fixed on the support plate 150.

While the cam rotation is between 0° and 425°, as shown in FIG. 2 and FIG. 4, the motion of the arm 140 is blocked so that it remains at the position shown in FIG. 2, because the pin 144 on the arm 140 is engaged by the projecting stop 146. The fast winding pulley 158 is spaced from the pair of reel drive turntables 20 and 22 and the pulley 154. Therefore the rotational power from the capstan motor 110 is not transmitted to the reel drive turntables 20 or 22. A guide (not shown) is mounted on the chassis 12 so as to make the distances from the supply reel drive turntable 20 and from the take-up reel drive turntable 22 to the fast winding pulley 158 equal.

Figure 6:
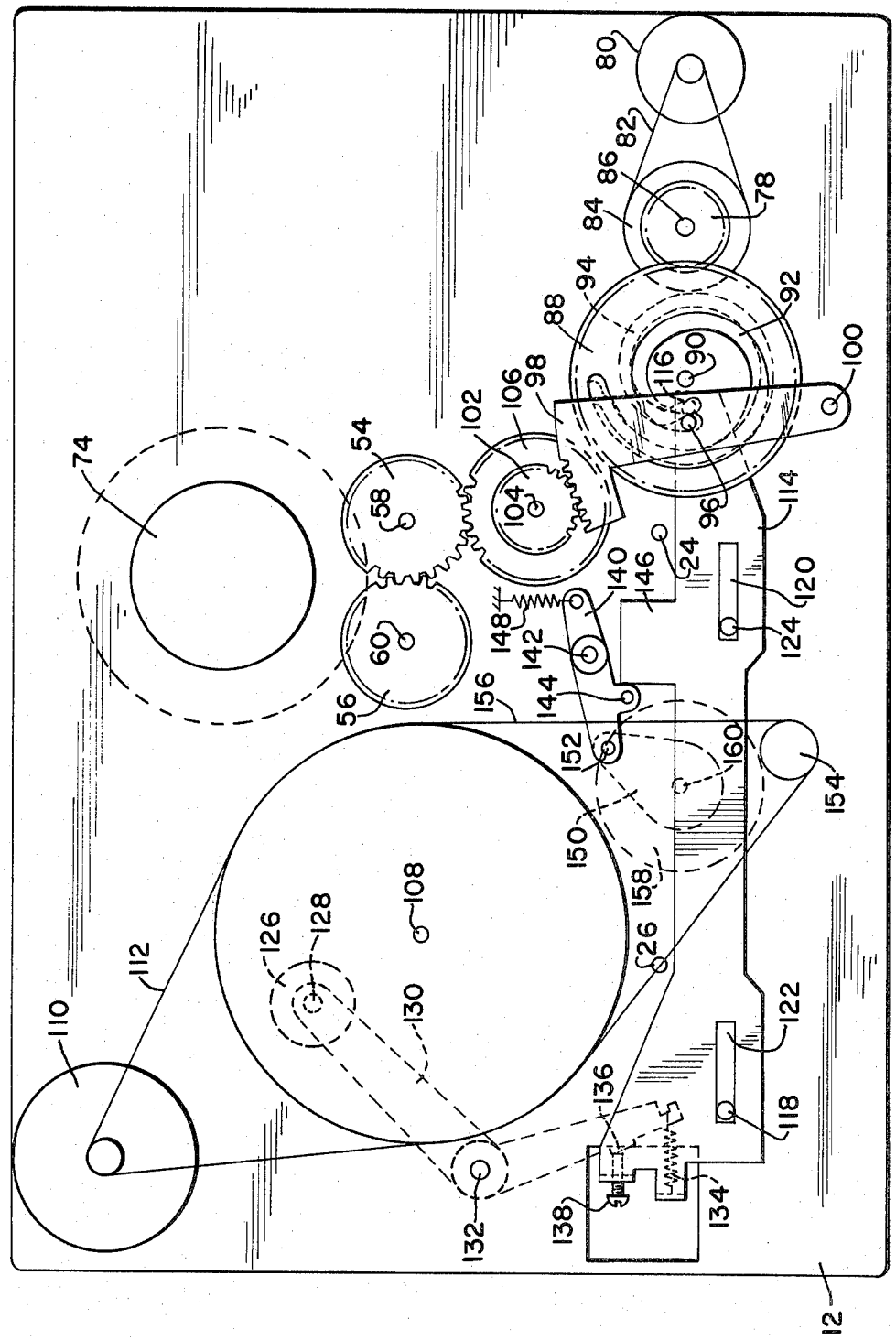

When the cam disk 88 rotates clockwise from the position in FIG. 2, the main rod 114 begins to move right. As the cam disk 88 rotates to −25°, the main rod 114 moves to the position shown in FIG. 6, the arm 140 swings counterclockwise in FIG. 6 under the tension force of the tension spring 148, because the projecting stop 146 moves away from the pin 144.

Consequently, the fast winding pulley 158 moves downward in the figures, and comes into contact with pulley 154 as shown in FIG. 5. At this time, the pulley 154 is urged to swing the fast winding pulley 158 in the left or right direction in FIG. 5 in response to the rotational direction of the pulley by well-known means (not shown). Thus the fast winding pulley 158 is selectively positioned between the pulley 154 and one of the reel drive turntables 20 and 22. Consequently, the rotational power of the pulley 154, that is, the rotational power of the capstan motor 110, is selectively transmitted to one of the reel drive turntables 20 and 22.

As stated above, during the rotation of the cam disk 88 from 0° to −25°, the rotational power of the motor 110 is not transmitted to the magnetic tape drawing means described above, but only to the main rod 114 which changes the operation mode of the apparatus. Therefore, changing the operation mode is easily achieved by the construction described above.

Next, the operation of one embodiment of the tape recording/reproducing apparatus according to present invention will be explained hereinafter.

Pushing a recording/reproducing mode button (not shown) when the parts are in the inoperative position shown in FIG. 1, causes the capstan motor 110 to rotate counterclockwise in FIG. 2 so as to rotate the capstan 108 clockwise in FIG. 1. At same time, the motor 80 begins to rotate clockwise in FIG. 2. The rotational power of the motor 80 is transmitted to the cam disk 88 synchronizingly through the belt 82 and the gear 78. As shown in FIG. 8 in curve "a", even though the cam disk 88 begins to rotate, the sector gear 98 does not move immediately.

After 50° of cam rotation, the first cam follower 96 engaged in the cam groove 92 is moved in the left direction in FIG. 2. Therefore, the sector gear 98 is swung counterclockwise around the shaft 100 in FIG. 2, and the two pairs of guide pins 36, 38 and 40, 42 are moved in the direction of arrow A in FIG. 1 as described above, and the magnetic tape 14 is drawn out of the tape cartridge 10. As the cam disk 88 rotates to the 360 degree point, the guide pins 36, 38 and 40, 42 come to the positions shown in FIG. 3.

As shown in FIG. 8 by curve "a", past 360°, the sector gear 98 does not move, and guide pins 36, 38 and 40, 42 are kept at the positions in FIG. 3. As shown in FIG. 8 in curve "b", when the cam disk 88 begins to rotate from 0° in the plus direction, the main rod 114 does not move immediately. Therefore, the pinch roller 126 remains in the position in FIG. 1.

After 20° of cam rotation, the second cam follower 116 engaged in the cam groove 94 is driven in the left direction in FIG. 2, and the main rod 114 is moved in the left direction on the guide shafts 118, 120. Consequently, the support arm 130 begins to swing counterclockwise in FIG. 1, and the pinch roller 126 makes contact with the capstan 108. Thus the rotational power of the motor 80 is intermittently and/or selectively transmitted to the sector gear 98 and the main rod 114.

When the cam disk 88 has rotated to 425° and the main rod 114 has been moved to the position shown in FIG. 4, a switch (not shown) is turned off, and the electric power supply to the motor 80 is cut off. The pinch roller 126 is urged against the capstan 108 by the force of the tension spring 134, and the magnetic tape 14 is fed by the capstan 108 and the pinch roller 126 and wound on the take-up reel 18 by well-known means (not shown) previously employed. Thus the magnetic tape 14 is loaded around the guide drum 74 and against the audio magnetic head 76, and the signals are recorded and/or reproduced on/from the magnetic tape 14.

Pushing a stop mode button (not shown) when the apparatus is in the recording/reproducing mode as described above, causes the capstan 108 to stop because the electric power supply to the capstan motor 110 is turned off. At the same time, the electric power supply to the motor 80 is turned on and the motor 80 rotates counterclockwise in FIG. 4.

At the beginning the reverse of the operation described above, the guide pins 36, 38 and 40, 42 and pinch roller 126 are returned to the positions in FIG. 1. At this time, the magnetic tape 14 loaded around a guide drum 74 is returned into the tape cartridge 10 by well-known means (not shown). A switch (not shown) is then turned on, the motor 80 stops and it is returned to the inoperative mode as shown in FIG. 1.

During the above operation, the fast winding pulley 150 is spaced from both the reel drive turntables 20 and 22 and the pulley 154 because the movement of the pin 144 fixed on the arm 140 is stopped by the projecting stop 146 formed on the main rod 114.

Next, as the operator pushes the fast forward mode button (not shown) of the apparatus when it is in the inoperative mode as shown in FIG. 1, the capstan motor 110 rotates counterclockwise in FIG. 2. The motor 80 also rotates counterclockwise in FIG. 2 and the main rod 114 is moved in the right direction in FIG. 2. The arm 140 is swung counterclockwise around the shaft 142 in FIG. 2. As the cam rotation reaches −25°, the main rod 114 moves to the position shown in FIG. 6, a switch (not shown) is actuated, and the electric power supply to the motor 80 is cut off. The fast winding pulley 158 makes contact with the pulley 154 and is urged to swing in the right direction in FIG. 1 because the pulley 154 rotates clockwise in FIG. 1, and then the fast winding pulley 158 makes contact with both the pulley 154 and the take-up reel drive turntable 22. And the take-up reel drive turntable 22 is rotated clockwise, so that the magnetic tape 14 wound on the supply reel 16 is wound up onto the take-up reel 18. At this time, the pinch roller 126 moves to the position in FIG. 5.

When the operator pushes the stop mode button (not shown) of the apparatus when it is in the fast forward winding mode as shown by solid lines in FIG. 5, the electric power supply to the capstan motor 110 is cut off. Therefore, the capstan 108 and the pulley 154 are stopped. At this time, the motor 80 begins to rotate clockwise in FIG. 6, and the operation is the reverse of that described above. Therefore, the fast winding pulley 158 is returned to the neutral position as shown in FIG. 1 along guides (not shown), and the main rod 114 and pinch roller 126 are returned to the position in FIG. 1. Then a switch (not shown) is turned off, the electric power supply to the motor 80 is cut off, and it is returned to the inoperative position as shown in FIG. 1.

During the above operation, the guide pins 36, 38 and 40, 42 are kept in the positions in FIG. 1, and the magnetic tape 14 is not drawn out from the tape cartridge 10, but the main rod 114 is moved between the inoperative position and the fast winding position. Thus the rotational power of the motor 80 is selectively transmitted to the main rod 114.

When the operator pushes the fast rewind mode button (not shown) of the apparatus when it is in the inoperative mode as shown in FIG. 1, the capstan motor 110 rotates counterclockwise and the pulley 154 is rotated counterclockwise in FIG. 1. Also, the motor 80 rotates counterclockwise in FIG. 2, and the main rod 114 is moved to the position in FIG. 6 in the same action as for the fast forward mode. As shown by the broken lines in FIG. 5, the fast winding pulley 158 makes contact with the pulley 154 and the supply reel drive turntable 20, and the supply reel drive turntable 20 is rotated counterclockwise in FIG. 5, and therefore the magnetic tape 14 wound on the take-up reel 18 is wound up onto the supply reel 16.

When the operator pushes the stop mode button (not shown) of the apparatus when it is in the fast rewind mode, the fast winding pulley 154, the main rod 114 and pinch roller 126 are returned to the positions in FIG. 1 the same as when the stop mode button (not shown) is pushed in the fast forward mode, and the apparatus is returned to the inoperative condition.

As stated above, the plus direction of cam rotation from the inoperative position is for the recording/reproducing mode, and the minus direction of the cam rotation is for the fast winding mode, and the cam disk 88 rotated in synchronization with the rotation of the motor 80 drives the sector gear 98 and the main rod 114 intermittently and/or selectively. Therefore, shifting from the recording/reproducing mode to the fast winding mode or vice versa is very smooth.

Thus a compact, light and low-cost magnetic tape recording/reproducing apparatus can be provided by driving the magnetic tape drawing operation and the apparatus condition changing operation with one motor 80. It should also be appreciated that the apparatus can be changed so as to have a main rod which is driven to a recording/reproducing, stop and fast winding position by the cam rotation. However, it is much more effective to have the cam with the cam groove as described because it makes possible an exact stroke distance of the main rod.

It is apparent that various modifications may be made without departing from the spirit of the invention. The above described specific example is intended merely to illustrate the various facets in one embodiment of the invention, the scope of which is limited only by the following claims.

What is claimed is:

1. A magnetic tape recording and/or reproducing apparatus for recording and/or reproducing signals on a magnetic tape wound on reels contained in a tape cartridge, said apparatus comprising:
   a pair of reel drive turntables engagable with the reels for rotating the reels;
   tape moving means for moving the magnetic tape at a constant speed;
   means for carrying out recording and/or reproducing of signals on/from the magnetic tape in a specific tape path outside of the tape cartridge;
   loading means for drawing the magnetic tape out of the tape cartridge and loading the magnetic tape in said specific path;
   a loading means and operating mode changing means driving motor;
   intermittent driving means driven by said motor and connected to said loading means for changing the rotational motion of a motor to an intermittent motion for driving said loading means; and
   operating mode changing means comprising a rotating member driven by said motor and which rotates to a plurality of positions in synchronization with the rotation of said motor for changing the operating mode of said apparatus to operating modes corresponding to the respective ones of said plurality of positions.

2. An apparatus according to claim 1, wherein said intermittent driving means comprises a first cam driven by said motor, and a first cam follower moved by said first cam when it is driven by said motor for changing the rotational motion of said motor to the intermittent motion.

3. An apparatus as claimed in claim 2 wherein said first cam has a first cam groove therein with which said first cam follower is engaged for driving said loading means in both the drawing out operation and the loading operation thereof, whereby resilient means for driving said loading means is unnecessary.

4. An apparatus as claimed in claim 3 wherein said first cam groove is on said rotating member.

5. An apparatus as claimed in claim 2 wherein said operating mode changing means comprises a second cam on said rotating member, a second cam follower moved by said second cam to a plurality of positions corresponding to the plurality of positions of said second cam, driven means driven from said second cam follower to a plurality of positions corresponding to the positions of said second cam follower, and operating mode control means at each position to which said driven means is moved for controlling the operating mode of said apparatus and operated by said driven means when said driven means is in the corresponding position.

6. An apparatus as claimed in claim 5 wherein said motor is rotatable in opposite directions, and said driven means is driven to said positions and back, and said second cam has a second cam groove with which said second cam follower is engagable for driving said driven means, whereby resilient means for driving said driven means is unnecessary.

7. An apparatus as claimed in claim 5 wherein said motor is rotatable in opposite directions, and said driven member is movable to a recording/reproducing position and to a fast winding position on opposite sides of a start position, said second cam having a shape for, when said motor rotates in on direction, moving said driven member from said start position to said recording/reproducing position and, when said motor rotates in the other direction, moving said driven member from said start position to said fast winding position.

8. An apparatus as claimed in claim 7 in which said motor is connected to said intermittent driving means for, when said motor rotates in the other direction, said intermittent driving means is not driven.

9. An apparatus as claimed in claim 1 in which said motor is rotatable in opposite directions, and said intermittent driving means comprises a first cam on one side of said rotating member, a first cam follower, said first cam having a shape for causing said first cam follower to be moved by said first cam only when said rotating member is driven in one direction for changing the rotational motion of said motor into intermittent motion, and said operating mode changing means comprises a second cam on the other side of said rotating member, a second cam follower moved by said second cam to a plurality of positions corresponding to the plurality of positions of said second cam, driven means from said second cam follower to a recording/reproducing position and to a fast winding position on opposite sides of a start position, said second cam means having a shape for, when said motor rotates in said one direction, moving said driven member from said start position to said recording/reproducing position, and, when said motor rotates in the other direction, moving said driven member from said start position to said fast winding position.

* * * * *